US010115250B2

United States Patent
Biehl et al.

(10) Patent No.: US 10,115,250 B2
(45) Date of Patent: Oct. 30, 2018

(54) SYSTEMS AND METHODS FOR LOCATION ENABLED ELECTRONIC LOCK CONTROLS

(71) Applicant: FUJI XEROX CO., LTD., Tokyo (JP)

(72) Inventors: Jacob Biehl, San Jose, CA (US);
Gerald Filby, San Francisco, CA (US);
Adam Lee, Pittsburgh, PA (US);
Matthew L. Cooper, San Francisco, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/162,533

(22) Filed: May 23, 2016

(65) Prior Publication Data
US 2017/0337755 A1 Nov. 23, 2017

(51) Int. Cl.
| | |
|---|---|
| *G05B 23/00* | (2006.01) |
| *G05B 19/00* | (2006.01) |
| *G07C 9/00* | (2006.01) |
| *H04W 24/08* | (2009.01) |
| *H04W 4/02* | (2018.01) |
| *H04W 12/04* | (2009.01) |
| *H04W 76/11* | (2018.01) |

(52) U.S. Cl.
CPC ...... *G07C 9/00111* (2013.01); *G07C 9/00309* (2013.01); *H04W 4/025* (2013.01); *H04W 12/04* (2013.01); *H04W 24/08* (2013.01); *H04W 76/11* (2018.02); *G07C 2009/0042* (2013.01)

(58) Field of Classification Search
CPC .................................................. H04W 4/025
USPC ....................................................... 340/5.21
See application file for complete search history.

(56) References Cited

U.S. PATENT DOCUMENTS

| | | | |
|---|---|---|---|
| 5,397,884 A | 3/1995 | Saliga | |
| 6,016,476 A | 1/2000 | Maes et al. | |
| 6,182,221 B1 | 1/2001 | Hsu et al. | |
| 6,326,885 B1 | 12/2001 | Togashi | |
| 6,359,547 B1 | 3/2002 | Denison | |
| 9,491,588 B1 * | 11/2016 | Biehl | ........... H04W 4/043 |
| 2004/0003257 A1 * | 1/2004 | Mitchell | ........ G07C 9/00103 |
| | | | 713/182 |
| 2009/0238426 A1 * | 9/2009 | Fear | ............ G06K 9/3216 |
| | | | 382/128 |

(Continued)

OTHER PUBLICATIONS

G. Han et al. Dynamic threshold adjustment in a proximity-based location tracking system using reference modules. Proc. of Int. Wireless Comm. & Mobile Comp. Conf. p. 1248-1253.

(Continued)

*Primary Examiner* — Santiago Garcia
(74) *Attorney, Agent, or Firm* — TransPacific Law Group; Pavel I. Pogodin, Esq.

(57) ABSTRACT

A computer-implemented method, the method being performed in a system comprising an electronic lock and a client device comprising a central processing unit, a localization signal receiver and a memory, the computer-implemented method comprising: receiving at least one localization signal using the localization signal receiver; measuring a strength of the received localization signal; using the central processing unit to extract a identifier from the received localization signal; determining a location of the client device based at least on the measured strength of the received localization signal and the extracted identifier; and causing the electronic lock to unlock based on the determined location.

18 Claims, 7 Drawing Sheets

(56) References Cited

U.S. PATENT DOCUMENTS

| | | | | |
|---|---|---|---|---|
| 2016/0189454 A1* | 6/2016 | Johnson | ............ | G07C 9/00007 |
| | | | | 340/5.61 |
| 2016/0189459 A1* | 6/2016 | Johnson | ............ | G07C 9/00309 |
| | | | | 340/5.61 |
| 2016/0189503 A1* | 6/2016 | Johnson | ............ | G07C 9/00944 |
| | | | | 348/152 |
| 2016/0292938 A1* | 10/2016 | Zakaria | ............ | G07C 9/00571 |
| 2017/0019378 A1* | 1/2017 | Johnson | ............ | H04L 63/0428 |

OTHER PUBLICATIONS

Potts, J. et al. Exploiting Bluetooth on Android mobile devices for home security application, in Southeastcon, 2012 Proceedings of IEEE , vol., No., pp. 1-4, Mar. 15-18, 2012.

August Smart Lock—HomeKitTM enabled. http://www.august.com/wp-content/uploads/2015/10/August-Smart-Lock_Spec-Sheet.pdf visited on May 25, 2016.

Lockitron, Wikipedia. https://en.wikipedia.org/wiki/Lockitron visited on May 25, 2016.

Kwikset Kevo Fact Sheet Updated May 20, 2015 http://kwiksetpresskit.com/wp-content/uploads/2015/05/Kevo-Fact-Sheet_Final_5-20-15.pdf visited on May 25, 2016.

* cited by examiner

SYSTEMS AND METHODS FOR LOCATION ENABLED ELECTRONIC LOCK CONTROLS

BACKGROUND OF THE INVENTION

Technical Field

The disclosed embodiments relate in general to security systems and methods and, more specifically, to systems and methods for location enabled electronic lock controls.

Description of the Related Art

Mobile devices are quickly becoming the primary (and in some cases, single) driver for credential and identity management. Some examples are very simple, such as two-factor authentication, where the mobile device provides a time-variant second source of authentication. Other examples are more complex, such as mobile payment technologies like Apple Pay and Google Wallet. Perhaps the ultimate example of this transition is the recent announcement by state governments in the US (e.g. Delaware) to start issue virtual driver's licenses that leverage the security features in modern smartphones and cloud services.

Recently, mobile devices began to be used for authentication for purposes of physical access control using electronic locks. For example, U.S. Patent Application Publication No. US20040003257A1 describes an electronic lock system that requires a key "transmitter" and a room transceiver. The transceiver needs to be proximal to the room, and thereby also the key, to unlock the door. The aforesaid reference also describes the use of a second key, which may be used for secondary authentication.

As would be appreciated by those of skill in the art, despite the aforesaid technological advances, new and improved systems and methods are needed for enabling electronic locks to be controlled via a user's mobile device while providing a trusted mechanism of location accountability.

SUMMARY OF THE INVENTION

The embodiments described herein are directed to methods and systems that substantially obviate one or more of the above and other problems associated with conventional electronic lock control systems.

In accordance with one aspect of the inventive concepts described herein, there is provided a computer-implemented method, the method being performed in a system comprising an electronic lock and a client device comprising a central processing unit, a localization signal receiver and a memory, the computer-implemented method involving: receiving at least one localization signal using the localization signal receiver; measuring a strength of the received localization signal; using the central processing unit to extract an identifier from the received localization signal; determining a location of the client device based at least on the measured strength of the received localization signal and the extracted identifier; and causing the electronic lock to unlock based on the determined location.

In one or more embodiments, determining the location comprises transmitting a request comprising the measured strength of the received localization signal and the extracted identifier to a location server and receiving the location from the location server.

In one or more embodiments, the request is digitally signed with a private key of the client device.

In one or more embodiments, the location comprises a location identifier.

In one or more embodiments, the location received from the location server is signed with a private key of the location server.

In one or more embodiments, causing the electronic lock to unlock comprises transmitting a request comprising the location information to a lock server.

In one or more embodiments, the request is digitally signed with a key.

In one or more embodiments, the request comprises an identifier of the client device, an identifier of a user of the client device and an identifier of the electronic lock.

In one or more embodiments, comprising transmitting a request comprising an identifier of the client device and an identifier of a user of the client device to a lock server, receiving, in response to the request, from the lock server a list of locks and displaying the received list of locks to the user.

In one or more embodiments, causing the electronic lock to unlock comprises identifying a second user capable of approving the unlock of the electronic lock, transmitting an approval request from a lock server to a second client device of the identified second user and receiving an approval message of the unlock of the electronic lock.

In one or more embodiments, the approval message comprises an identifier of the second client device, an identifier of the second user of the client device and an identifier of the electronic lock.

In one or more embodiments, the approval message is digitally signed with a private key of the second client device.

In one or more embodiments, causing the electronic lock to unlock comprises identifying a second user capable of witnessing the unlock of the electronic lock, transmitting a witness request from a lock server to a second client device of the identified second user, determining a location of the second client device and receiving a witness message of the unlock of the electronic lock.

In one or more embodiments, the witness message comprises an identifier of the second client device, an identifier of the second user of the client device, an identifier of the electronic lock and the determine location of the second client device.

In one or more embodiments, the witness message is digitally signed with a private key of the second client device.

In one or more embodiments, receiving at least one localization signal using the localization signal receiver comprises receiving a plurality of localization signals provided by a plurality of beacons disposed within a building and wherein the location is determined based on the received plurality of localization signals.

In one or more embodiments, receiving at least one localization signal using the localization signal receiver comprises receiving a plurality of localization signals provided by a plurality of WiFi hotspots disposed within a building and wherein the location is determined based on the received plurality of localization signals.

In one or more embodiments, the method further comprises validating the determined location of the client device, wherein validating the determined location comprises comparing a key extracted from the received localization signal with the second randomly generated key previously sent to a beacon, which generated the received localization signal, wherein the determined location is invalidated if the key and the second key are not the same.

In accordance with another aspect of the inventive concepts described herein, there is provided a non-transitory computer-readable medium embodying a set of computer-executable instructions, which, when executed in connection with a system comprising an electronic lock and a client device comprising a central processing unit, a localization signal receiver and a memory, cause the system to perform a method comprising: receiving at least one localization signal using the localization signal receiver; measuring a strength of the received localization signal; using the central processing unit to extract an identifier from the received localization signal; determining a location of the client device based at least on the measured strength of the received localization signal and the extracted identifier; and causing the electronic lock to unlock based on the determined location.

In accordance with yet another aspect of the inventive concepts described herein, there is provided a system comprising an electronic lock and a client device comprising a central processing unit, a localization signal receiver and a memory, the memory storing a set of computer-readable instructions causing the system to perform a method comprising: receiving at least one localization signal using the localization signal receiver; measuring a strength of the received localization signal; using the central processing unit to extract an identifier from the received localization signal; determining a location of the client device based at least on the measured strength of the received localization signal and the extracted identifier; and causing the electronic lock to unlock based on the determined location.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there are provided systems and methods enabling a mobile phone or other mobile device to be the primary driver for physical access control in commercial and enterprise applications. The described embodiments enhance and extend an electronic lock solution to provide greater features and functionality. The aforesaid functionality is enabled by the combination of an electronically controlled lock and an indoor location service that provides trusted location determination, which is described in U.S. patent application Ser. No. 14/732,777, incorporated herein by reference.

The combination of these technologies enables a number of novel functions for electronic locks, especially in office-based environments. Exemplary novel functions include the requirement to have multiple users provide approval and or physically witness a lock being actuated and the ability to change lock policy and lock behavior based on physical location of one or more uses (proxied by the users' device). Another embodiment of the described technology may leverage the advanced security features of many modern devices (e.g. Apple's finger print scanner, Microsoft retina scanner) to provide multi-factor, biometric authentication.

Figure 1:
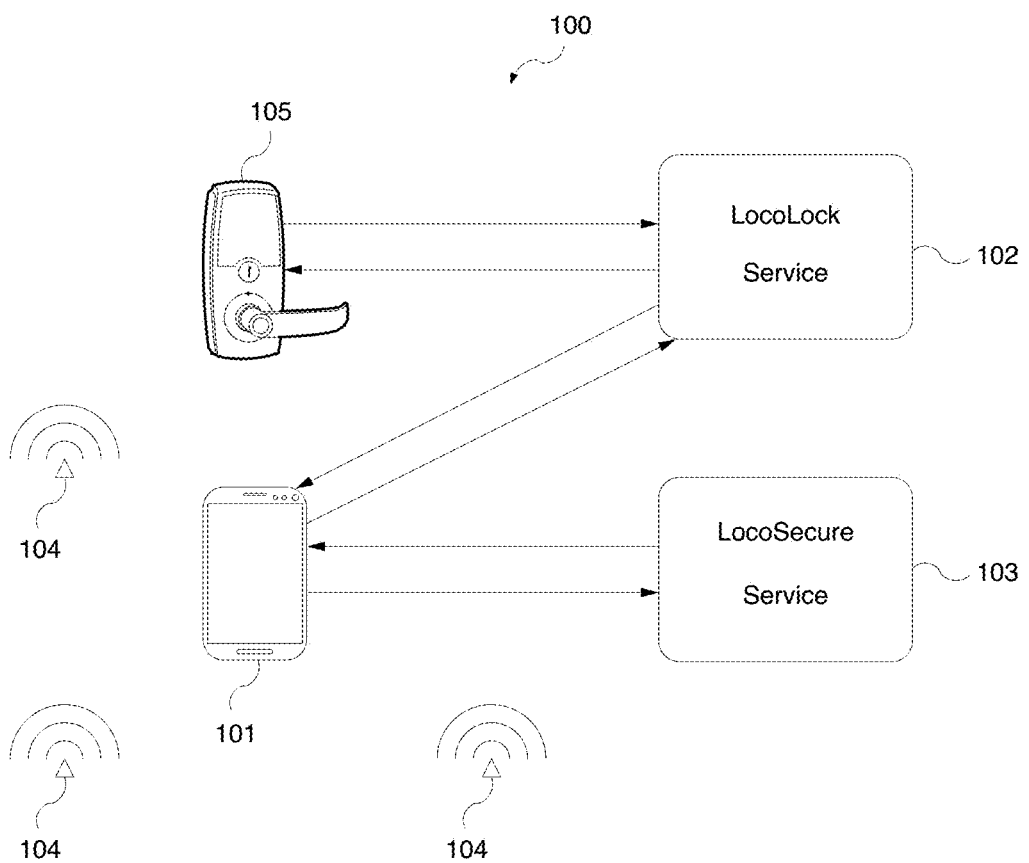
FIG. 1 illustrates an exemplary embodiment of a system for location enabled electronic lock controls.

Some of the basic functions of an embodiment of the system and the major components that enable those functions will now be described in detail. Specifically, FIG. 1 illustrates an exemplary embodiment of a system 100 for location enabled electronic lock controls. In the most basic use case, the purpose of an embodiment of the described system is to allow a user, who is using his personal device (e.g. smartphone), to assert his or her location and use that location along with an access policy to actuate a door lock in absence of a physical key.

Client Devices

In one or more embodiments, a mobile phone, tablet, laptop, desktop computer or any other mobile computing device 101 is used as a client device for user interaction. The same client device may incorporate an appropriate Bluetooth Low Energy (BLE) and/or WiFi hardware in order to scan the environment for wireless signals generated by base stations (WiFi) and/or beacons 104 (BLE), which are well known to persons of ordinary skill in the art. The output from the aforesaid WiFi and/or BLE hardware deployed on the client device 101 contains a hardware ID of the corresponding base station and/or beacon 104 and an indication of the signal strength of the received advertisement. This information is serialized, encoded and transmitted by the client device 101 to a remote LocoSecure service 103, which returns location determination information.

Figure 2:
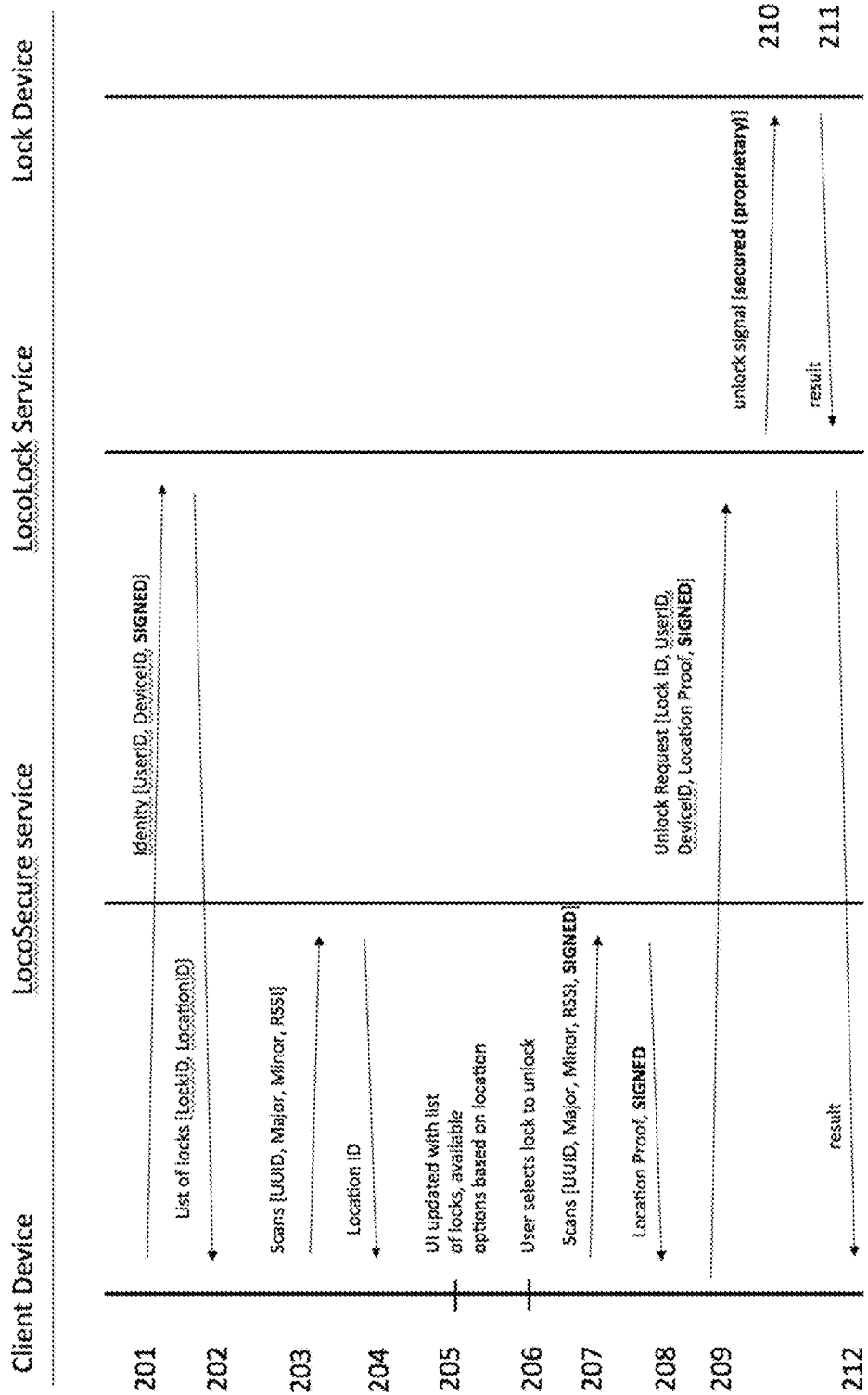
FIG. 2 illustrates an exemplary control flow diagram for the direct access unlock procedure.

In one or more embodiments, once a location is determined, the client device 101 communicates with a LocoLock service 102 to provide a list of locks as well as the rules (defined as policies, attributes, and claims) for how and when the lock can be opened, see, for example, steps 201 and 202 in FIG. 2, which illustrates an exemplary control flow diagram for the direct access unlock procedure.

LocoLock Service

In one or more embodiments, the LocoLock service 102 is an Internet accessible web service that provides access to the application programming interfaces (APIs) for managing users, locks, and various policy components that manage lock access. When a client device 101 requests a list of locks for client's location, it uses the client's location to determine the rules that exist for each lock, given the user's identity and location.

LocoSecure Service

In one or more embodiments, the LocoSecure service 103 is an Internet accessible web service that, when provided with information about BLE and WiFi signals (such as a hardware ID of the base station or beacon and an indication of the signal strength of the received advertisement) by the client device 101, returns a determination of the client's location, such as a unique location identifier (ID) and a human-readable description.

In one or more embodiments, an important functionality provided by the LocoSecure service 103 is that its location determination of the client device is trusted. As described in detail in the aforesaid U.S. patent application Ser. No. 14/732,777, the advertisements emitted by the BLE beacons 104 in the environment contain secret keys that are collected by the client devices and transmitted as part of the scan information to the aforesaid LocoSecure service 103. The LocoSecure service 103 verifies that these secret keys are valid and only after that issues the location determination for the client device 101.

As would be understood by persons of ordinary skill in the art, while the described embodiment is built on LocoSecure service 103, it's functionality could still be created using a different location framework, so long as the location determination could be authenticated. Therefore, the inventive concepts described herein are not limited to the LocoSecure service 103.

Network Enabled Door Locks

In one or more embodiments, an Internet-connected electronic lock 105 is used for physical access control. This lock incorporates an electronic lock connected to a WiFi and/or BLE enabled System-on-Chip (SoC). Using the aforesaid network connection(s), the aforesaid Internet-connected lock 105 can be contacted by the lock service, such as LocoLock service 102, and actuated by means of an encrypted request.

Mechanism and Architecture for Actuation Rules

In one or more embodiments, the system 100 described above can be extended, through software controls, to perform four overall functions: unlock, approve, witness, and claim of a lock. These features are based on both the policies placed on the lock and the trusted location(s) of one or more client devices.

In one or more embodiments, the fundamental components that the system uses to define, provide, and protect are comprised of policies, targets, attributes, and users. Each lock is associated with access defined by one or more policies. Policies are represented in the following format. Each policy has a unique ID, and identifies a single lock to which it applies. It then contains one or more targets. ALL targets must be satisfied in order for the policy to be satisfied. Each target can either identify a single user, or a conjunction of attributes that must be possessed by a user who satisfies this target (e.g. "member of group A" and "member of group B"). Each target also has a proximity flag, indicating whether users matching that target must be physically located near the lock to activate it.

In one or more embodiments, multiple targets can be used, for instance, to indicate that "Bob" can access a particular lock (Target 1) as long as he is physically accompanied by user belonging to the attribute class "workspace administrator" (Target 2). For most embodiments, policies are likely to contain only a single target.

To illustrate the relationship between locks, policies, targets, attributes, and users, consider the situation where a lock should be opened by, say, either Alice *or* Bob. This would NOT be configured using two targets (which would require Alice *and* Bob). Instead, two policies should be specified: one for Alice and one for Bob. Alternatively, an attribute (e.g., "my office guests") could be created and assigned to both Alice and Bob, and a single policy could be authored stating that any user with this attribute can actuate the lock.

In one or more embodiments, a lock that is claimable can have claims placed on it. A claim policy is set by a lock administrator and defines which targets and/or attributes can enact a claim. Once a lock is claimed, additional policies can be placed on the lock. This can be done, for instance, to support scenarios 4 and 5, described below.

In one or more embodiments, creation and manipulation of policies, targets, and attributes is performed through administrative interfaces on the LocoLock service. As an implementation detail of the specified embodiment, the interactions between the client device and the LocoLock service 102 are secured by encrypting parts of the messages exchanged. The aforesaid encryption is implemented using a public and private key pair for each device, as it is well known in the art. When a client device is enrolled with the system, the lock service is given the client device's public key. When the client device's 101 (and the user, by the nature of how users are managed) request needs to be authenticated, the request is signed using the client device's 101 private key. The LocoLock server 102 verifies the request using the aforesaid public key, which was previously supplied at registration.

In one or more embodiments, the LocoLock service 102 manages user accounts, as well as user-to-device bindings. The LocoLock service 102 maintains a database of users and devices. The users table manages basic information about users (e.g. first name, last name, email address), while the devices table tracks which devices are registered to a given user. Each device is associated with a public/private key pair; the public key is stored in the device table so that the service can validate client signatures on secure localization requests, as described above.

In one or more embodiments, the locks are also represented and managed by the LocoLock service 102. The Locks table contains basic information about each lock: a short description of the lock, the room protected by this lock, a BLE station id used by the client to wake up the lock 105, and a unique ID used by the server to actuate the lock. Another table creates the association between a lock and its location (specifically, its location ID).

Mechanism and Operation of Unlock Sequence

In one or more embodiments, opening a door involves coordination between the client device 101, the LocoSecure service 103, and the LocoDoor service 102. Below will be described the sequence of events for opening the lock 105 that a user has direct access to unlock, an example of a lock being opened with approval, and an example of a lock being opened with a witness.

Direct Access Unlock

1. In one or more embodiments, the mobile client 101 carries out a device scan, substantially as described in the aforesaid U.S. patent application Ser. No. 14/732,777. The client device 101 sends this scan information, along with the user ID, device ID, and a cryptographic signature of the information being sent to the LocoSecure service 103, see step 203 in FIG. 2. It is important to note that the LocoSecure service 103 does not maintain knowledge of client identities. Identity is entirely managed by the LocoLock service 102 and client applications. As such, LocoSecure service 103 does not validate these signatures.

2. In one or more embodiments, the LocoSecure service extracts the device scan information, checks to see that the rotating minors in the BLE advertisements are current (ensuring that this is a fresh location request), and classifies the client device location. It then returns a message to the client device that is a cryptographically signed message that includes the device's location (as a location ID), see step 204 in FIG. 2.

3. In one or more embodiments, the client device constructs as an open door request command based on the user's selection of a lock from a list of available locks based on location, see steps 205 and 206 in FIG. 2. This command is comprised of:

a. the lock ID lock to be actuated, a timestamp, the user ID of the user requesting the unlock, the device ID of the device being used to request the unlock.

b. a cryptographic signature over the user ID and device ID, using the device's private key.

c. the original location scan information (for forensic use) and the signed LocoSecure message containing the location ID of the device's current location and obtained from LocoSecure service 103 in steps 207 and 208 in FIG. 2.

d. a random nonce to prevent replay tampering.

This information is transmitted to the LocoLock servicel, see step 209 in FIG. 2.

4. In one or more embodiments, the LocoLock service carries out a series of checks to ensure that this request is valid and not a replay. Specifically:

a. A check is made to the database to ensure that the random nonce in this request has not been used before, thereby ensuring that this request is not a replay.

b. The user ID and device ID signature is validated to ensure that the owner of the private key associated with this combination made the initial localization request.

c. The location signature is validated to ensure that the same individual made the door actuation request is that same as the one that completed the LocoSecure proof of location.

d. If all of the above checks succeed, this nonce is logged in the database to prevent replays of this request in the future.

e. The door server then validates the LoCo proof by:

i. Checking to see whether the LoCo proof is less than two minutes old (or however long the validation interval is set by the system administrator).

ii. Validating the LocoSecure signature, which ensures that the client identity, scan data, and classified location have not been tampered with.

f. If all of the above checks pass, the server then checks to ensure that the user is authorized by some policy protecting the lock ID.

g. The LocoLock service sends a unlock signal to the door hardware to perform the unlock operation, see step 210 in FIG. 2.

5-7. [skipped, to provide correct sequencing for other forms of requests, discussed below]

8. In one or more embodiments, the door hardware validates the request, and performs the unlock operation.

9. In one or more embodiments, in all cases—either success or failure—an access attempt is logged to the database.

The results of the unlock operation are sent to the LocoLock service and then to the client device 101, see steps 211 and 212 in FIG. 2.

"Approval Required" Unlock

Figure 3:
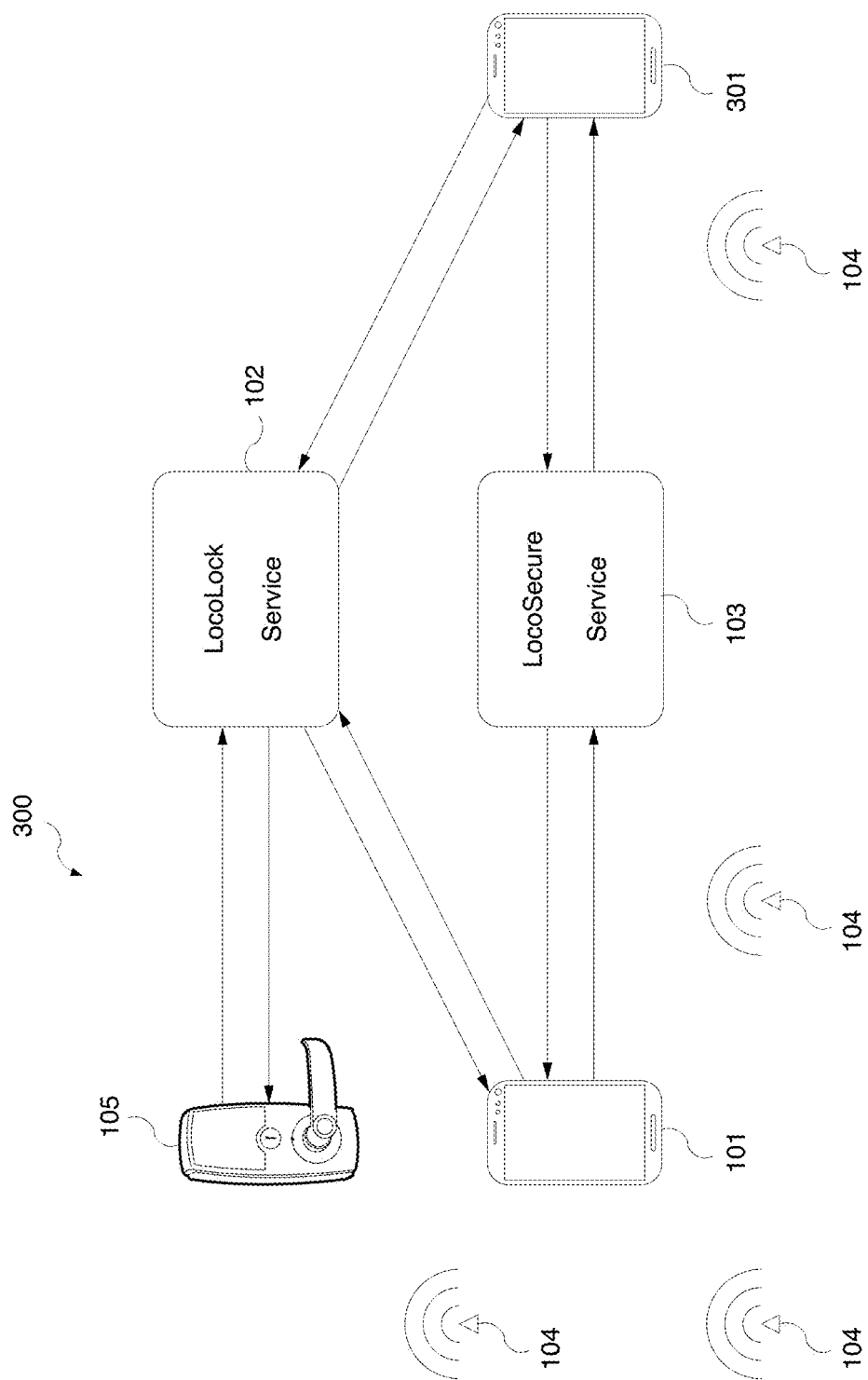
FIG. 3 illustrates an exemplary embodiment of a system for location enabled electronic lock controls with a second client device, which may be used for approving the unlock request or for serving as a witness.

"Approval required" unlock means the policy on the lock has determined that for the particular user to be granted access to actuate the lock, another user (either specific or part of an attribute class) must approve the unlock request on his or her device. FIG. 3 illustrates an exemplary embodiment of a system 300 for location enabled electronic lock controls with a second client device 301, which may be used for approving the unlock request or for serving as a witness as described below. To approve an unlock request, the approving user of the device 301 DOES NOT need to be physically present near the lock 105.

Figure 4:
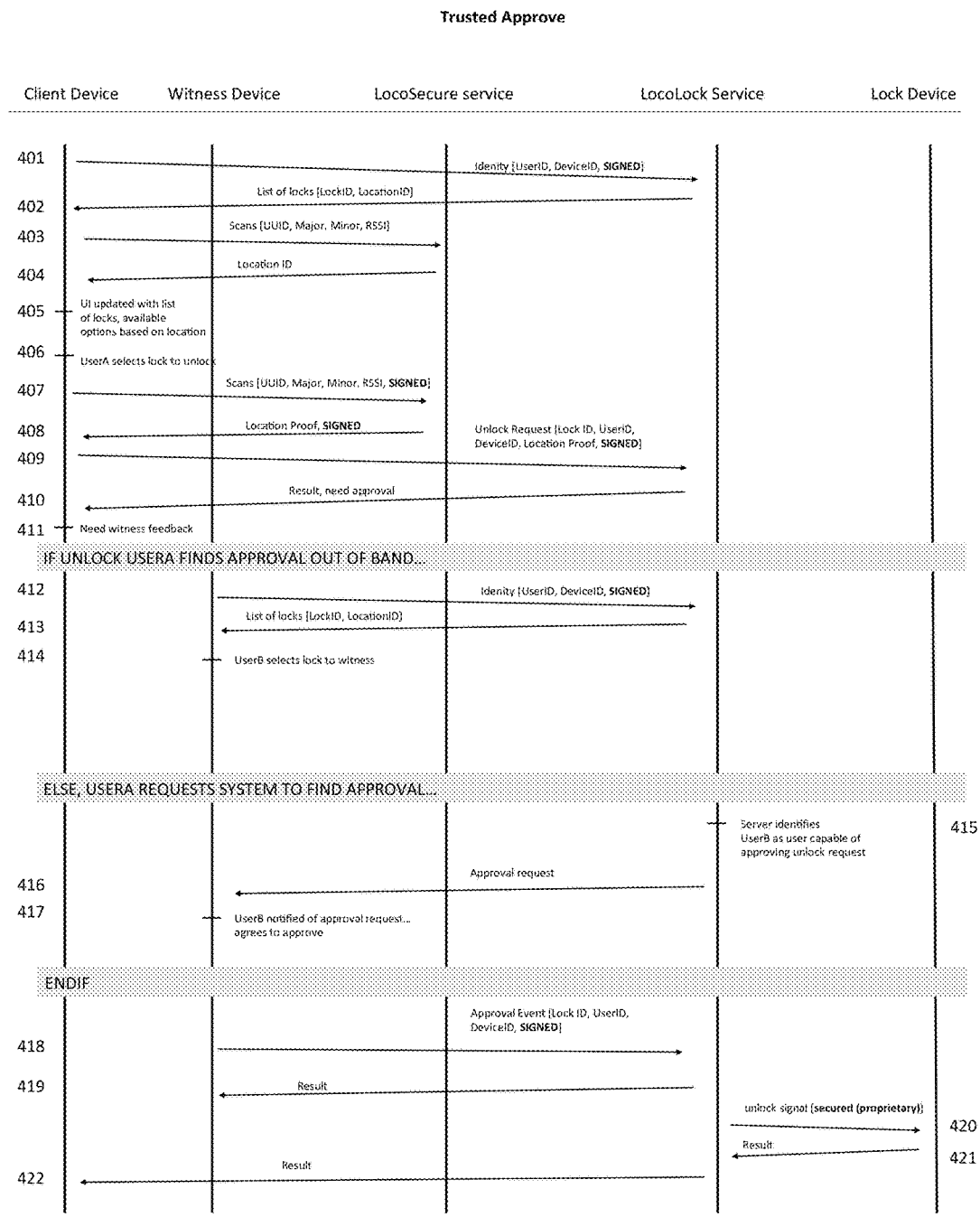
FIG. 4 illustrates an exemplary control flow diagram for an "approval required" unlock procedure.

In the event that an approval is required, additional steps in the above chain of events occurs. FIG. 4 illustrates an exemplary control flow diagram for an "approval required" unlock procedure. Everything is the same (steps 401-409 in FIG. 4) up until step 4(f) above. This step (410 in FIG. 4) is now replaced by the following:

f. The LocoLock service determines that an approval is needed to actuate the lock 105. A message is sent back the requesting client device with this request, along with a list of individuals and/or attributes of individuals that can approve the request, see step 410 in FIG. 4.

5. The requesting client device shows the approval required result (step 411 in FIG. 4) and presents the user with two options: 1) have the LocoLock service notify a particular approving agent via a direct message to the approver's device (step 415-417 in FIG. 4), or 2) allow the requesting user to find an approving user offline (e.g. find a nearby co-worker with appropriate access), see steps 412-414 in FIG. 4.

6. The approving client builds a message that comprises the user ID and device ID for the user and the device the user is using to submit the approval. Additionally, the approving user specifies how long their approval should remain valid. This message is cryptographically signed using the approving agent's device's private key.

7. The LocoLock service receives the approval request form the approving user's device (step 418 in FIG. 4).

a. The user ID and device ID signature is validated to ensure that the owner of the private key associated with this combination made the approval request.

b. The door server then validates the approval request.

i. Checking to see whether the approval request is within the time period allowed by the approving user and returns feedback to the approver client device, see step 419.

c. The LocoLock service sends a unlock signal to the door hardware to perform the unlock operation, see step 420 in FIG. 4.

The unlock result is returned to the LocoLock service and to the client device, see steps 421 and 422 in FIG. 4.

"Witness Required" Unlock

In one or more embodiments, "witness required" means that the policy on the lock has determined that for the particular user to be granted access to actuate the lock, another user (wither specific or part of an attribute class) must be present and witness the requesting user opening the lock.

Figure 5:
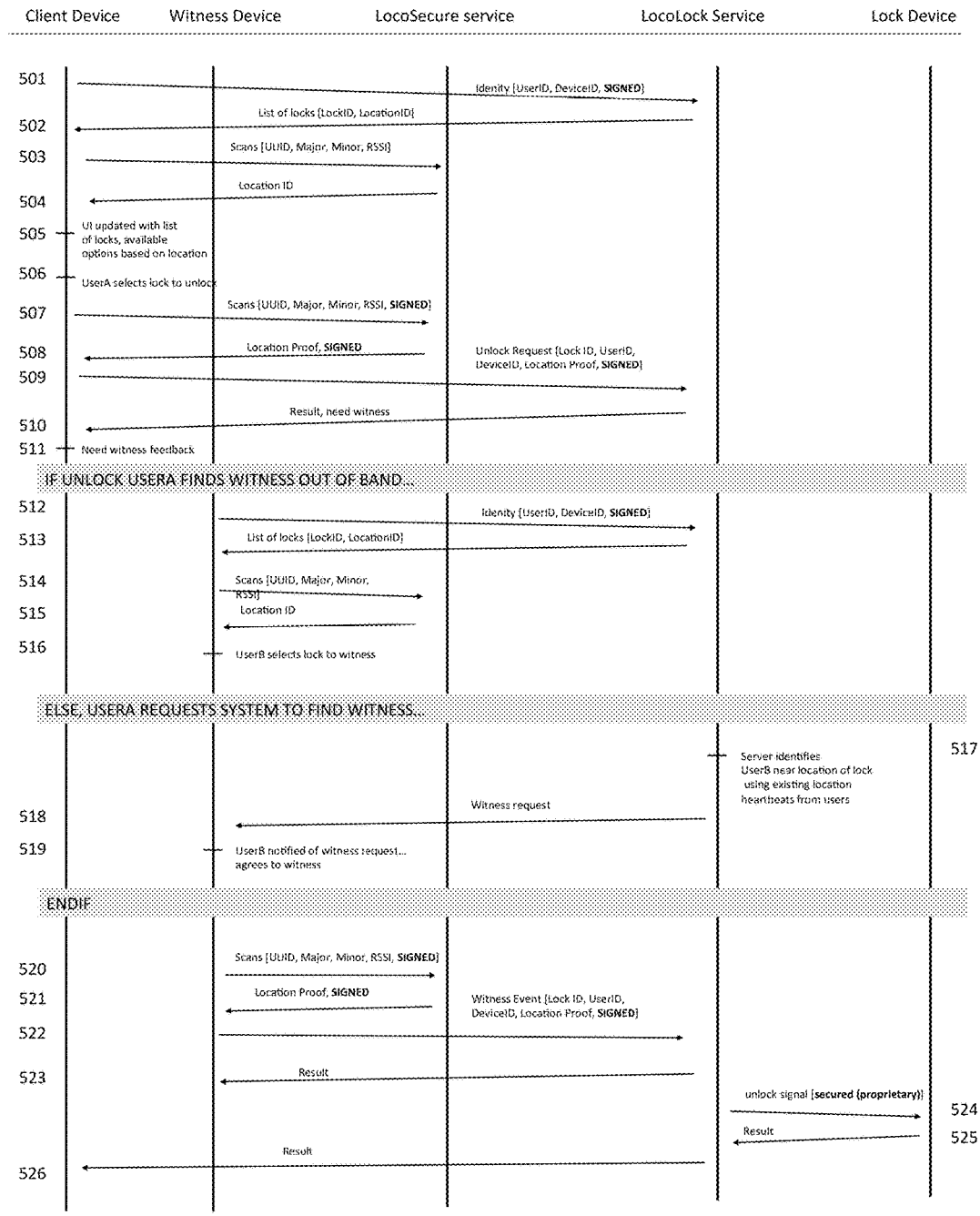
FIG. 5 illustrates an exemplary control flow diagram for a "witness required" unlock procedure.

FIG. 5 illustrates an exemplary control flow diagram for a "witness required" unlock procedure. In one or more embodiments, the sequence of steps for effectuating the "witness required" unlock is the same as the approval sequence above (steps 501-519 and 524-526 in FIG. 5), except for the following step 6, which now involves the witnessing client to also submit a location proof:

6. The witness client device carries out a device scan. The client device sends this scan information, along with the user ID, device ID, and a cryptographic signature of the information being sent to the LocoSecure service, see step 520 in FIG. 5. Upon receiving the signed location message back from the LocoSecure service (step 521 in FIG. 5), the approving client builds a message that comprises the location message from LocoSecure, the user ID, and device ID for the user and the device the user is using to submit the witness (see step 522 in FIG. 5). This message is cryptographically signed using the witnessing agent's device's private key. The result is returned in step 523 of FIG. 5.

Scenarios of Use

While the above description offers a mechanical description of how the invention operates, it may be difficult to understand the value of use. Below we provide some scenarios that illustrate how the invention is envisioned to be used.

1. No Ghost in the Office Scenario

One wants to provide access to a location (e.g. one's office), but wants to insure that the delegate person is unlocking when they are physically at the location, and not remote.

2. The Buddy System Scenario

One wants to provide access to a location (e.g. one's office, supply closet) but wants to make explicit social norms about getting access to a location. That is, if one has to get someone else to assist, it better be a legitimate reason for needing access.

3. Audit after Activation Scenario

Situations where one wants to audit for specific accountability violations. For instance, a worker entering a supply room, and leaving without closing the door. In one or more embodiments, the LocoLock service 102 could be configured to alert the user that last left the location that the violated the policy of not closing the door behind them.

Another use case, extending the buddy system scenario, is where one wants to audit to ensure continuation of presence. For instance, given access to one's office but requiring two people be present to avoid snooping. Violations could alert office owner, and access parties that they are not following the policy rules.

4. The Human Semaphore Scenario

The presence of absence of human (perhaps roles specific) controls behavior of the lock.

Examples

Mail clerk: If present anyone can enter mailroom without authorization; if not present, authentication is required for audit trail/accountability.

Hotel room: If present in room, disallow maid to enter room for cleaning.

Doctor's office: When doctor is present in exam room, lock door and require authorization from support staff (explicit interruption of privacy)

5. Squatters' Rights Scenario

Occupying a room (perhaps for a minimum amount of time) allows the person to control, in a limited time window, access to the room.

Examples

Lawyers occupy a conference room, need to leave for lunch, can lock the room physically with documents and other materials left in the room securely.

Lab worker leaves ongoing project in a particular lab space, wants to prevent tampering or disruption.

Ability to take possession of an open/on demand work location (e.g. taking possession of breakout room for a period of time).

As would be appreciated by persons of ordinary skill in the art, these features allow employees to take possession of space without heavy use of admin services. In various embodiments, access can be delegated to associates easily, and provides an audit trail for the space utilizer while in possession of the space.

Computing Platforms

Figure 6:
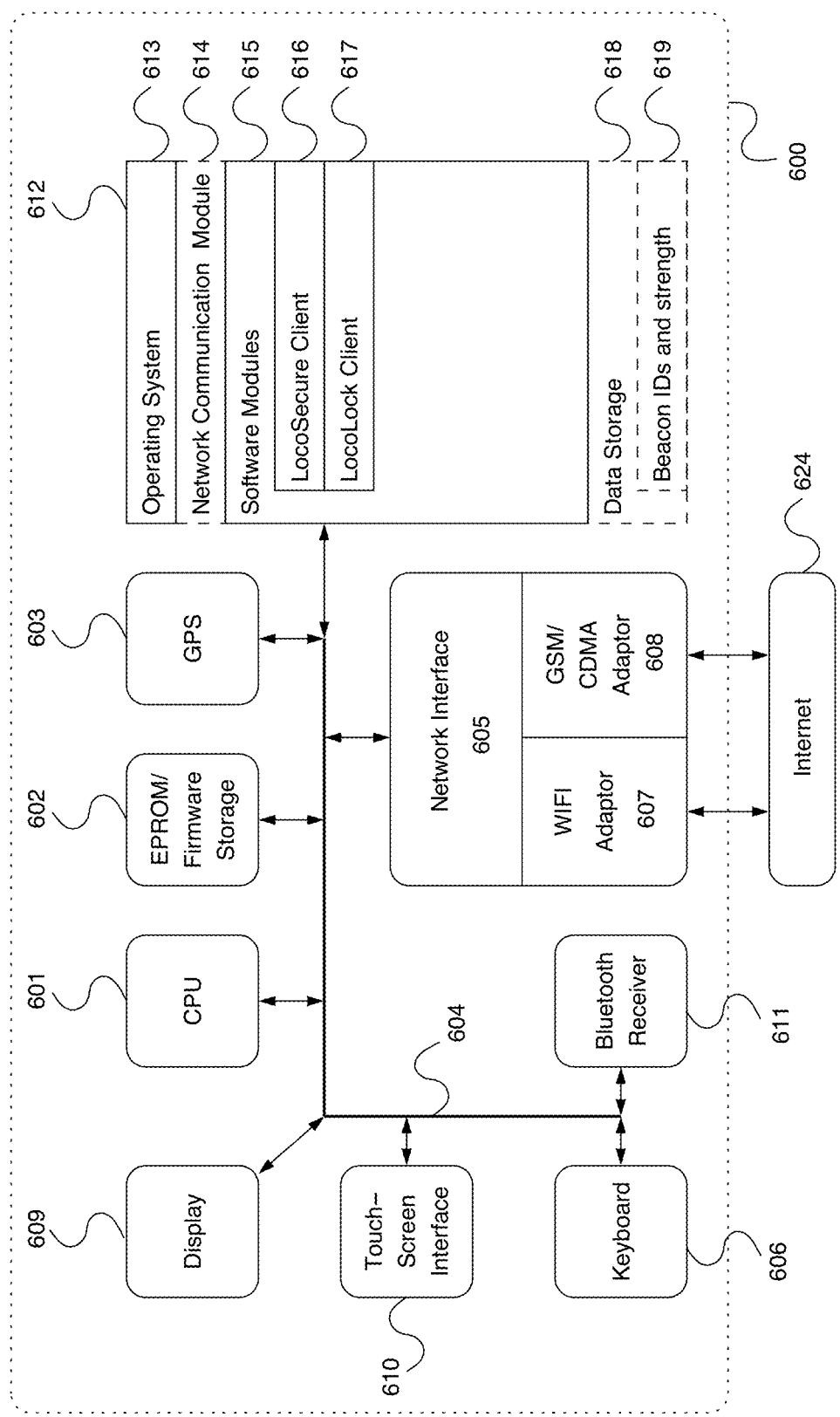
FIG. 6 illustrates an exemplary embodiment of a computerized mobile system that could be used as the client device in connection with the system for location enabled electronic lock controls illustrated in FIG. 1.

FIG. 6 illustrates an exemplary embodiment of a computerized mobile system 600 that could be used as the client device 101 in connection with the system for location enabled electronic lock controls illustrated in FIG. 1. In one or more embodiments, the computerized mobile system 600 may be implemented within a form factor of a mobile computing device, such as a smartphone, a personal digital assistant (PDA), a tablet computer, or a smart watch, all of which are widely available commercially and are well known to persons of skill in the art.

The computerized system 600 may include a data bus 604 or other interconnect or communication mechanism for communicating information across and among various hardware components of the mobile computerized system 600, and a central processing unit (CPU or simply processor) 601 coupled with the data bus 604 for processing information and performing other computational and control tasks. Computerized system 600 also includes a memory 612, such as a random access memory (RAM) or other dynamic storage device, coupled to the data bus 604 for storing various information as well as instructions to be executed by the processor 601. The memory 612 may also include persistent storage devices, such as a magnetic disk, optical disk, solid-state flash memory device or other non-volatile solid-state storage devices.

In one or more embodiments, the memory 612 may also be used for storing temporary variables or other intermediate information during execution of instructions by the processor 601. Optionally, computerized system 600 may further include a read only memory (ROM or EPROM) 602 or other static storage device coupled to the data bus 604 for storing static information and instructions for the processor 601, such as firmware necessary for the operation of the computerized system 600, basic input-output system (BIOS), as well as various configuration parameters of the computerized system 600.

In one or more embodiments, the computerized system 600 may incorporate a display device 609, which may be also coupled to the data bus 604, for displaying various information to a user of the computerized system 600. In an alternative embodiment, the display device 609 may be associated with a graphics controller and/or graphics processor (not shown). The display device 609 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 609 may be incorporated into the same general enclosure with the remaining components of the computerized system 600. In an alternative embodiment, the display device 609 may be positioned outside of such enclosure.

In one or more embodiments, the computerized system 600 may further incorporate a GPS receiver connected to the data bus 604 and configured to receive location information from one or more GPS satellites and transmit this information to the processor 601 via the data bus 604.

In one or more embodiments, the computerized system 600 may incorporate one or more input devices, such as a touchscreen interface 610 for receiving tactile commands and a keyboard 606, which all may be coupled to the aforesaid data bus 604 for communicating information, including, without limitation, user command selections to the processor 601. In an alternative embodiment, input devices may include a system for tracking eye movements of the user (not shown), which may be used to indicate to the computerized system 600 the command selection by the user.

In one or more embodiments, the computerized system 600 may additionally include a location signal receiver 611, such as a Bluetooth receiver, configured to perform scan for beacons 101 and supply scan data described above to the processor 601 via the data bus 604.

In one or more embodiments, the computerized system 600 may additionally include a communication interface, such as a network interface 605 coupled to the data bus 604. The network interface 605 may be configured to establish a connection between the computerized system 600 and the Internet 624 using at least one of WIFI interface 607 and the cellular network (GSM or CDMA) adaptor 608. The network interface 605 may be configured to provide a two-way data communication between the computerized system 600 and the Internet 624. The WIFI interface 607 may operate in compliance with 802.11a, 802.11b, 802.11g and/or 802.11n protocols as well as Bluetooth protocol well known to persons of ordinary skill in the art. In an exemplary implementation, the WIFI interface 607 and the cellular network (GSM or CDMA) adaptor 608 send and receive electrical or electromagnetic signals that carry digital data streams representing various types of information. For example, the aforesaid networking components may be used to establish a network data connection between the computerized system 600 and other components of the localization system 100, such as the central server 104 and third party services/applications 108.

In one or more embodiments, the Internet 624 typically provides data communication through one or more sub-networks to other network resources. Thus, the computerized system 600 is capable of accessing a variety of network resources located anywhere on the Internet 624, such as web servers, other content servers as well as other network data storage resources. In one or more embodiments, the computerized system 600 is configured send and receive messages, media and other data, including application program code, through a variety of network(s) including Internet 624 by means of the network interface 605. In the Internet example, when the computerized system 600 acts as a network client, it may request code or data for an application program executing on the computerized system 600. Similarly, it may send various data or computer code to other network resources.

In one or more embodiments, the computerized system 600 uses the network interface 605 to send request(s), via the Internet 624, such as HTTP requests, to the central server 104 and receive various information, including, without limitation, the aforesaid location information and the timestamp, therefrom.

In one or more embodiments, the functionality described herein is implemented by computerized system 600 in response to processor 601 executing one or more sequences of one or more instructions contained in the memory 612. Such instructions may be read into the memory 612 from another computer-readable medium. Execution of the sequences of instructions contained in the memory 612 causes the processor 601 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 601 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 601 for execution. For example, the instructions may initially be carried on a magnetic disk from a remote computer. Alternatively, a remote computer can load the instructions into its dynamic memory and send the instructions over the Internet 624. Specifically, the computer instructions may be downloaded into the memory 612 of the computerized system 600 from the foresaid remote computer via the Internet 624 using a variety of network data communication protocols well known in the art.

In one or more embodiments, the memory 612 of the computerized system 600 may store any of the following software programs, applications or modules:

1. Operating system (OS) 613, which may be a mobile operating system for implementing basic system services and managing various hardware components of the computerized system 600. Exemplary embodiments of the operating system 613 are well known to persons of skill in the art, and may include any now known or later developed mobile operating systems.

2. Network communication module 614 for enabling network communications using one or more network interfaces described below.

3. Software modules 615 may include, for example, a set of software applications executed by the processor 601 of the computerized system 600, which cause the computerized mobile system 600 to perform certain predetermined functions, such as receive the beacon signals as described above. In one or more embodiments, the software modules 615 may include, for example, the LocoSecure client 616 as well as LocoLock client 617, configured to interact with the respective services 103 and 102, see FIG. 1.

3. Data storage 618 may be used, for example, for storing the bacon scan data 619.

Figure 7:
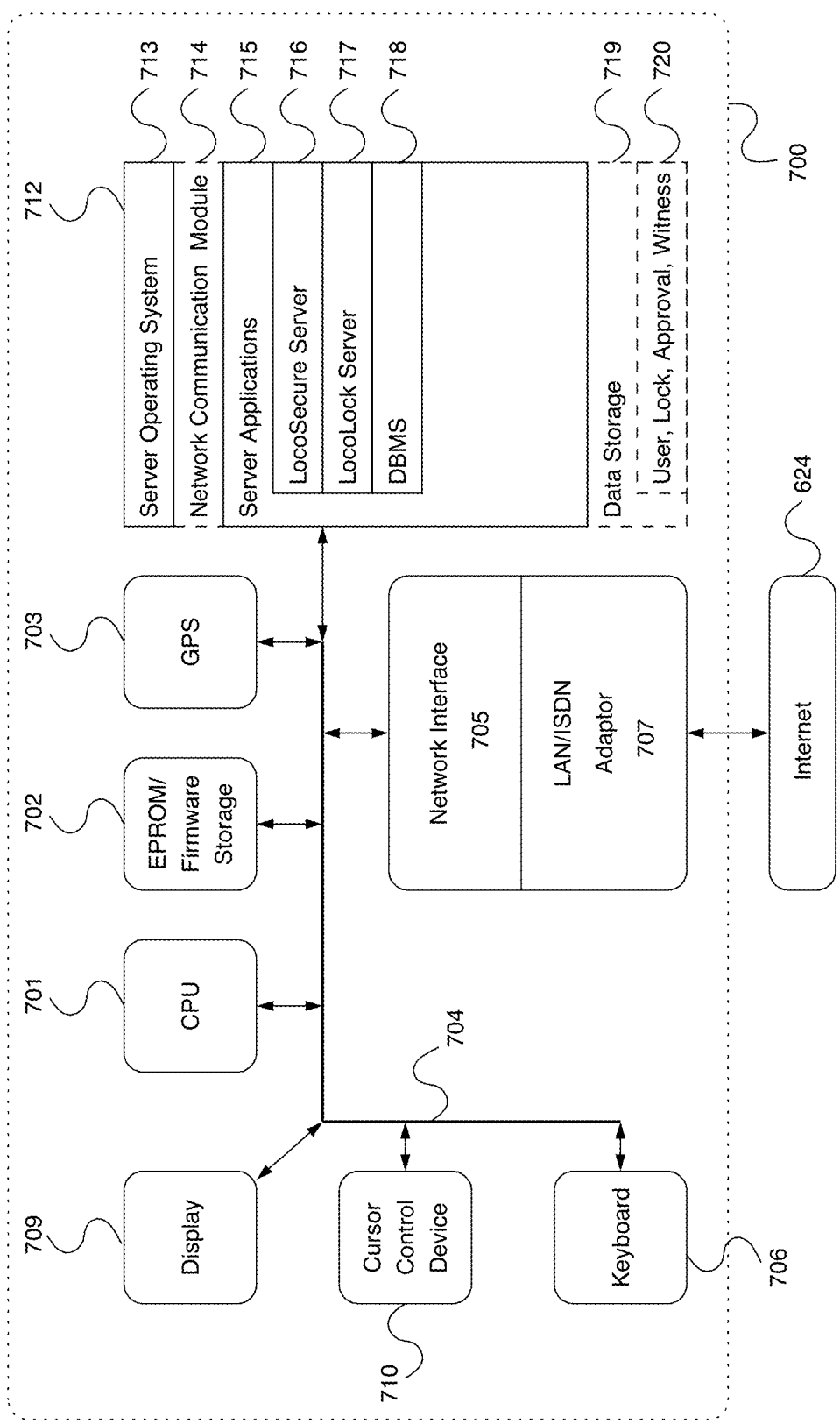
FIG. 7 illustrates an exemplary embodiment of a computerized server system which could be used, for example, as the LocoLock server or LocoSecure server in connection with the system for location enabled electronic lock controls illustrated in FIG. 1.

FIG. 7 illustrates an exemplary embodiment of a computerized server system 700 which could be used, for example, as the LocoLock server 102 or LocoSecure server 103 in connection with the system for location enabled electronic lock controls illustrated in FIG. 1.

In one or more embodiments, the computerized server system 700 may incorporate a data bus 704, which may be substantially similar and may perform substantially similar functions as the data bus 604 of the computerized system 600 illustrated in FIG. 6. In various embodiments, the data bus 704 may use the same or different interconnect and/or communication protocol as the data bus 604. The one or more processors (CPUs) 701, the network adaptor 705, the EPROM/Firmware storage 702, the display device 709 and the keyboard 706 of the computerized server system 700 may be likewise substantially similar to the respective processor 601, the network interface 605, the EPROM/Firmware storage 602, the display device 609 and the keyboard 606 of the computerized system 600, except that the former components are deployed in a server platform configuration. In various implementations, the one or more processors 701 may have substantially increased processing power as compared with the processor 601.

In addition to the input device 706 (keyboard), the computerized server system 700 may additionally include a cursor control device 710, such as a mouse, a trackball, or cursor direction keys for communicating direction information and command selections to processor 701 and for controlling cursor movement on the display device 709. This input device typically has two degrees of freedom in two axes, a first axis (e.g., x) and a second axis (e.g., y), that allows the device to specify positions in a plane.

The LAN/ISDN adaptor 707 of the computerized server system 700 may be implemented, for example, using an integrated services digital network (ISDN) card or a modem to provide a data communication connection to a corresponding type of telephone line, which is interfaced with the Internet 624 using Internet service provider's hardware (not shown). As another example, the LAN/ISDN adaptor 707 may be a local area network interface card (LAN NIC) to provide a data communication connection to a compatible LAN and the Internet 624.

In one or more embodiments, the memory 712 of the computerized server system 700 may store any of the following software programs, applications, modules and/or data:

1. A server operating system (OS) 713, which may be an operating system for implementing basic system services and managing various hardware components of the computerized server system 700. Exemplary embodiments of the server operating system 713 are all well known to persons of skill in the art, and may include any now known or later developed operating systems.

2. A network communication module 714 may incorporate, for example, one or more network protocol stacks which are used to establish a networking connection between the computerized server system 700 and the various network entities of the Internet 624, such as the computerized mobile system 600, using the network adaptor 705 working in conjunction with the LAN/ISDN adaptor 707.

3. Server applications 715 may include, for example, a set of software applications executed by one or more processors 701 of the computerized server system 700, which cause the computerized server system 700 to perform certain predetermined functions or tasks. In one or more embodiments, the server applications 715 may include the LocoLock server 717 and LocoSecure server 716. Additionally provided may be a database management system 718 for storing various tables described above.

4. Data storage 719 may be used, for example, for storing the user, lock, approval and witness tables 720.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in system and methods for location enabled electronic lock controls. It is intended that the specification and examples be considered as exemplary only, with a true scope and spirit of the invention being indicated by the following claims.

What is claimed is:

1. A computer-implemented method, the method being performed in a system comprising an electronic lock and a client device comprising a central processing unit, a localization signal receiver and a memory, the computer-implemented method comprising:
   a. receiving at least one localization signal using the localization signal receiver;
   b. measuring a strength of the received localization signal;
   c. using the central processing unit to extract an identifier from the received localization signal, wherein the extracted identifier uniquely identifies the source of the received localization signal;
   d. determining a location of the client device based at least on the measured strength of the received localization signal and the extracted identifier, wherein determining the location comprises transmitting a request comprising the measured strength of the received localization signal and the extracted identifier to a location server and receiving the location from the location server and wherein the request is digitally signed with a private cryptographic key of the client device; and
   e. causing the electronic lock to unlock based on the determined location.

2. The computer-implemented method of claim 1, wherein the location comprises a location identifier.

3. The computer-implemented method of claim 1, wherein the location received from the location server is signed with a private cryptographic key of the location server.

4. The computer-implemented method of claim 1, wherein causing the electronic lock to unlock comprises transmitting a request comprising the location information to a lock server.

5. The computer-implemented method of claim 4, wherein the request is digitally signed with a cryptographic key.

6. The computer-implemented method of claim 4, wherein the request comprises an identifier of the client device, an identifier of a user of the client device and an identifier of the electronic lock.

7. The computer-implemented method of claim 1, further comprising transmitting a request comprising an identifier of the client device and an identifier of a user of the client device to a lock server, receiving, in response to the request, from the lock server a list of locks and displaying the received list of locks to the user.

8. The computer-implemented method of claim 1, wherein causing the electronic lock to unlock comprises identifying a second user capable of approving the unlock of the electronic lock, transmitting an approval request from a lock server to a second client device of the identified second user and receiving an approval message of the unlock of the electronic lock.

9. The computer-implemented method of claim 8, wherein the approval message comprises an identifier of the second client device, an identifier of the second user of the client device and an identifier of the electronic lock.

10. The computer-implemented method of claim 8, wherein the approval message is digitally signed with a private cryptographic key of the second client device.

11. The computer-implemented method of claim 1, wherein causing the electronic lock to unlock comprises identifying a second user capable of witnessing the unlock of the electronic lock, transmitting a witness request from a lock server to a second client device of the identified second user, determining a location of the second client device and receiving a witness message of the unlock of the electronic lock.

12. The computer-implemented method of claim 11, wherein the witness message comprises an identifier of the second client device, an identifier of the second user of the client device, an identifier of the electronic lock and the determine location of the second client device.

13. The computer-implemented method of claim 11, wherein the witness message is digitally signed with a private cryptographic key of the second client device.

14. The computer-implemented method of claim 1, wherein receiving at least one localization signal using the localization signal receiver comprises receiving a plurality of localization signals provided by a plurality of beacons disposed within a building and wherein the location is determined based on the received plurality of localization signals.

15. The computer-implemented method of claim 1, wherein receiving at least one localization signal using the localization signal receiver comprises receiving a plurality of localization signals provided by a plurality of WIFI hotspots disposed within a building and wherein the location is determined based on the received plurality of localization signals.

16. The computer-implemented method of claim 1, further comprising validating the determined location of the client device, wherein validating the determined location comprises comparing a key extracted from the received localization signal with the second randomly generated key previously sent to a beacon, which generated the received localization signal, wherein the determined location is invalidated if the key and the second key are not the same.

17. A non-transitory computer-readable medium embodying a set of computer-executable instructions, which, when executed in connection with a system comprising an electronic lock and a client device comprising a central processing unit, a localization signal receiver and a memory, cause the system to perform a method comprising:
 a. receiving at least one localization signal using the localization signal receiver;
 b. measuring a strength of the received localization signal;
 c. using the central processing unit to extract an identifier from the received localization signal, wherein the extracted identifier uniquely identifies the source of the received localization signal;
 d. determining a location of the client device based at least on the measured strength of the received localization signal and the extracted identifier, wherein determining the location comprises transmitting a request comprising the measured strength of the received localization signal and the extracted identifier to a location server and receiving the location from the location server and wherein the request is digitally signed with a private cryptographic key of the client device; and
 e. causing the electronic lock to unlock based on the determined location.

18. A system comprising an electronic lock and a client device comprising a central processing unit, a localization signal receiver and a memory, the memory storing a set of computer-readable instructions causing the system to perform a method comprising:
 a. receiving at least one localization signal using the localization signal receiver;
 b. measuring a strength of the received localization signal;
 c. using the central processing unit to extract an identifier from the received localization signal, wherein the extracted identifier uniquely identifies the source of the received localization signal;
 d. determining a location of the client device based at least on the measured strength of the received localization signal and the extracted identifier, wherein determining the location comprises transmitting a request comprising the measured strength of the received localization signal and the extracted identifier to a location server and receiving the location from the location server and wherein the request is digitally signed with a private cryptographic key of the client device; and
 e. causing the electronic lock to unlock based on the determined location.

* * * * *